US006738541B2

(12) United States Patent
Hoke et al.

(10) Patent No.: US 6,738,541 B2
(45) Date of Patent: May 18, 2004

(54) OPTICAL SWITCH COMPRISING TWO NON-COPLANAR ARRAYS OF OPTICAL WAVEGUIDES

(75) Inventors: Charles D. Hoke, Palo Alto, CA (US); Brian E. Lemoff, Union City, CA (US); Julie E. Fouquet, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 121 days.

(21) Appl. No.: 09/956,413

(22) Filed: Sep. 18, 2001

(65) Prior Publication Data

US 2003/0053741 A1 Mar. 20, 2003

(51) Int. Cl.$^7$ .................................................. G02B 6/35
(52) U.S. Cl. ............................. 385/17; 385/18; 385/19; 385/20; 385/16
(58) Field of Search ............................. 385/17, 18, 16, 385/9, 19, 20, 47; 359/127, 128; 356/73.1; 257/457, 459, 466

(56) References Cited

U.S. PATENT DOCUMENTS

| | | | |
|---|---|---|---|
| 3,849,740 A | * 11/1974 | Brandt | 372/8 |
| 4,618,210 A | 10/1986 | Kondo | 350/96.14 |
| 5,157,748 A | 10/1992 | Mueller et al. | 385/41 |
| 5,381,251 A | 1/1995 | Nonomura et al. | 359/39 |
| 5,581,108 A | * 12/1996 | Kim et al. | 257/457 |
| 5,699,462 A | 12/1997 | Fouquet et al. | 385/18 |
| 6,324,316 B1 | * 11/2001 | Fouquet et al. | 385/16 |
| 6,327,397 B1 | * 12/2001 | Schiaffino et al. | 385/16 |
| 6,385,376 B1 | * 5/2002 | Bowers et al. | 385/50 |
| 6,459,828 B1 | * 10/2002 | Andersen | 385/17 |

* cited by examiner

Primary Examiner—Mohammad Sikder

(57) ABSTRACT

An optical switching assembly comprised of a substrate, a first plurality of waveguides in a first plane in the substrate, a second plurality of waveguides in a second plane parallel to said first plane in the substrate, the optical signals being selectively transferable from one substrate to the other. The second waveguides cross the first waveguides at an angle and the first waveguides each have a segment extending generally parallel to a segment of the second waveguides at the crossing. Controllable coupling material is disposed between the segments of the waveguides at the crossing and a control circuit is employed for selectively changing the index of refraction of the coupling material by electrical or thermal means.

26 Claims, 2 Drawing Sheets

OPTICAL SWITCH COMPRISING TWO NON-COPLANAR ARRAYS OF OPTICAL WAVEGUIDES

BACKGROUND OF INVENTION

1. Field of Invention

The present invention relates generally to optical switches and more particularly to waveguide based optical matrix switches.

2. Discussion of Related Art

Fiber optic networks for transmission of optical signals have come into wide use for telecommunications and data communications in recent years. These fiber optic networks need a rapid, efficient and effective means for switching a channel from one path to another within the network. Several switching techniques and structures have been developed in recent years that are satisfactory for many applications for switching a single channel from one path to another. However, these are not entirely satisfactory for functioning as large cross connect switches.

Several cross connect switches using a waveguide matrix have recently been developed. A common problem of current waveguide based matrix switches is the decrease in power of an optical signal as it traverses each potential switch point. The light typically leaves the waveguide at the switch points and propagates (unguided) across the cross point and then back into the waveguide. The coupling of the light from one waveguide to another results in a notable power loss at each cross point. A number of switch structures of this type are disclosed in U.S. Pat. Nos. 5,699,462 and 5,960,131. In general, an optical signal must traverse between one and (2*N)−1 points in an N*N matrix switch.

Accordingly, there is a need for an improved waveguide-based switch that decreases the cross point power loss.

SUMMARY OF THE INVENTION

It is a primary purpose of the present invention to provide a waveguide based matrix switch that overcomes the above problems of the prior art by decreasing the cross point power loss.

The present invention provides a cross-point switch in which generally orthogonal waveguides are relatively parallel at their mutual cross point. For example, one of two generally orthogonal waveguides can have a 45 degree jog about the cross point, while the other waveguide has a −45 degree jog about the cross point. Herein, for purposes of determining whether two waveguides are generally orthogonal, the general orientation of a non-straight waveguide is that of a least-squares-fit straight line for that waveguide. A controller controls coupling material between the crossing waveguides to control the optical coupling between the waveguides. In practice, the waveguides can be formed at opposing faces of respective substrates.

This can be accomplished by placing two planar substrates parallel to one another, and having optical waveguides on the confronting surfaces. In the embodiment described in detail, the elongated waveguides on one plane are generally orthogonal to those on the other plane, except that at the crossing points each waveguide has a 45° jog in such a way that a short portion of both waveguides in a pair of waveguides are parallel at the crossing zone. While the waveguides appear to cross from a plan view perspective, they are spaced from each other. These parallel, spaced segments provide for the optical signal to transfer from the waveguide in one plane to the one it crosses in the other plane. Controllable coupling material is mounted between the parallel waveguide segments in the crossing zone. Switching of optical signals between the waveguides at the crossing zone is accomplished by applying an electronic or a thermal signal to the coupling material between the waveguides.

Other crossing angles are contemplated as well as are other ways to form the spaced waveguide planes with coupling material at the crossing zones.

As in the prior art, waveguides that are couplable at a cross point are generally orthogonal to facilitate routing and to minimize unintended coupling away from cross points. By providing that waveguides are parallel at mutual cross points, the present invention provides an increased coupling area. The increased coupling area improves power coupling between the waveguides while the coupling material is controlled to promote coupling. Thus, the present invention decreases the cross point power loss. Certain embodiments of the invention provide other advantages in addition to or in lieu of the foregoing.

BRIEF DESCRIPTION OF THE DRAWING

The objects, features and advantages of the invention will be more clearly perceived from the following detailed description, when read in conjunction with the accompanying drawing, wherein.

DETAILED DESCRIPTION OF THE PREFERRED EMBODIMENTS

Figure 1:
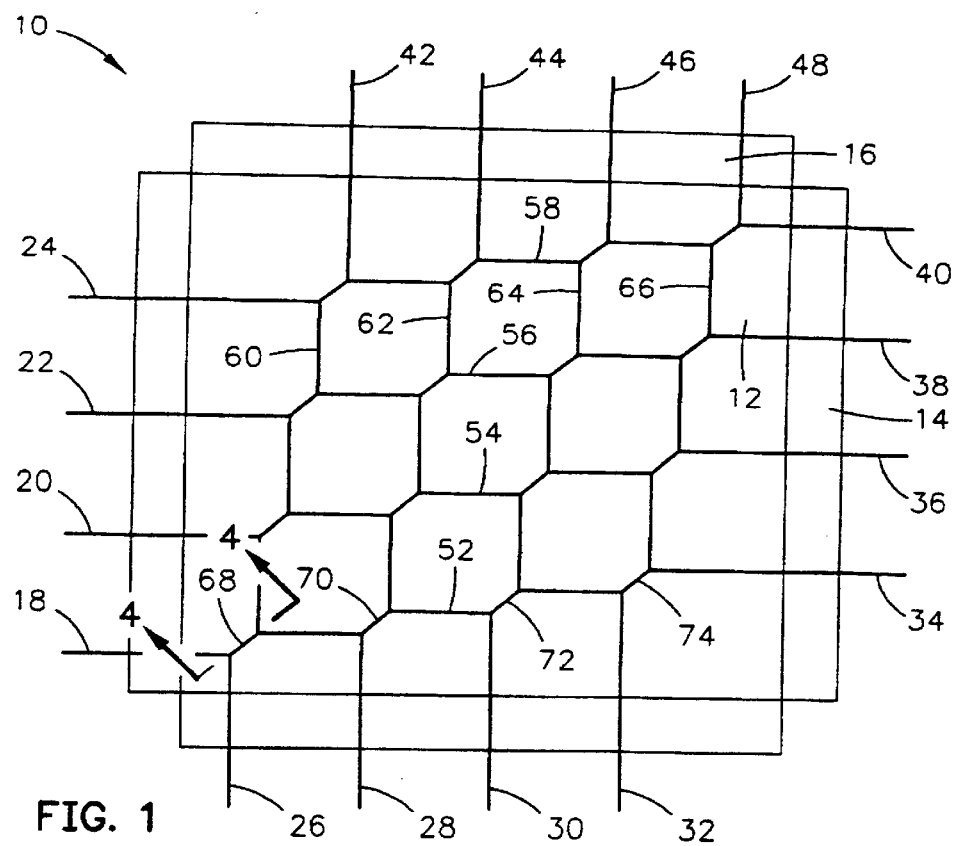
FIG. 1 is a diagrammatic illustration of a waveguide-based matrix switch in accordance with the present invention.

Referring to FIG. 1 of the drawing, a diagrammatic top plan view of a waveguide based matrix switch in accordance with an exemplary embodiment of the invention is illustrated and designated generally by reference numeral 10. This embodiment comprises main substrate 12 preferably comprised, as will be described, of a first, or lower, substrate 14 and a second, or upper, substrate 16. The substrates have a generally rectangular configuration but may have any other suitable shape. The illustrated embodiment comprises a generally bi-directional matrix cross connect switch having four optical fiber inputs 18, 20, 22, and 24 on one side and four optical fiber inputs 26, 28, 30, and 32 on a different side. The switch body has optical fiber outputs 34, 36, 38, and 40 on a third side and optical fiber outputs 42, 44, 46, and 48 on a side different from the previously identified inputs and outputs.

Figure 2:
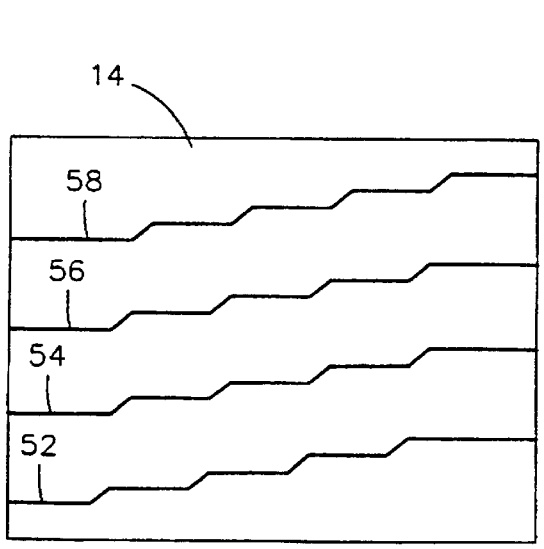
FIG. 2 is a diagrammatic top plan view of a substrate having one waveguide array to form a bottom portion of the waveguide-based matrix switch of FIG. 1.

Each of optical fiber inputs 18–24 is connected by a respective waveguide 52, 54, 56, 58 directly through to respective optical outputs 34–40 in a common first plane in substrate 14 (see FIG. 2). In a similar manner, optical inputs 26–32 are connected directly through waveguides 60, 62, 64, 66 in a second plane in substrate 16 (see FIG. 3) to optical outputs 42–48. The two sets of waveguides lie in spaced parallel planes and each has an angled portion at a crossover point where the waveguides in one substrate cross at a generally 90° angle to the waveguides in the other substrate.

The waveguides in lower substrate 14 overlie and cross the waveguides in upper substrate 16 at crossover points where switching is established. In one embodiment, the upper and lower waveguides are angled and extend along straight parallel sections a short distance at each crossover point. Take, for example, waveguide 60. As shown in FIG. 1, it crosses over waveguide 52 at cross point 68, where both have straight sections extending parallel to one another. Waveguide 62 also extends across waveguide 52 at a cross point 70, waveguide 64 extends across waveguide 52 at cross point 72, and waveguide 66 extends across waveguide 52 at cross point 74. The waveguides are in separate parallel planes, and are generally in a spaced orthogonal relationship to each other from plane to plane, except that they are generally parallel to one another for a short distance in the region of the crossing point. The waveguide core is also exposed in the region of the cross point and a layer of coupling material is placed between the two waveguides which can be controlled to act as a switch so that light waves can be made to switch from one waveguide to the other. This coupling material undergoes an index of refraction change when subjected to external influence such as thermal or electrical signals. The coupling material is selected to be either thermo-optically responsive or electro-optically responsive.

Figure 3:
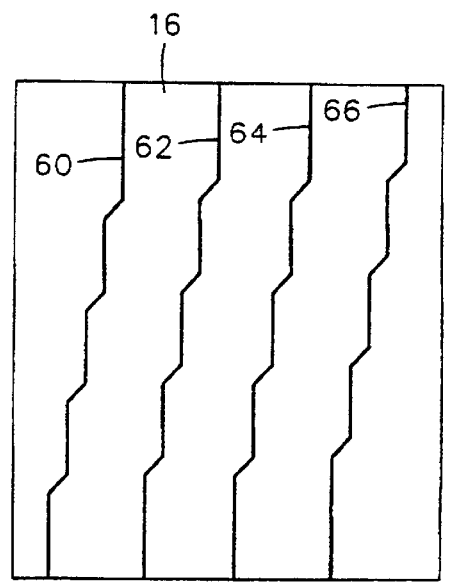
FIG. 3 is a diagrammatic top plan view of a substrate having one waveguide array to form a top portion of the waveguide-based matrix switch of FIG. 1.

Referring to FIGS. 2 and 3, substrates 14 and 16 are separately shown with waveguides formed therein. The waveguides are formed in substrate 14 near its upper surface and in substrate 16 near its bottom surface, so that when the substrates are sandwiched together the substrates are the appropriate distance apart at the crossover points or regions. Optical signals can then be switched or coupled from one waveguide to the other at the crossover points.

The waveguides may be formed in any one of a number of substrate materials in any suitable manner such as disclosed in U.S. Pat. No. 5,960,131. The substrates are selected to be a suitable material, an example being a semiconductor substrate, such as a silicon wafer or the like. Silicon processing techniques may be used to enable highly accurate fabrication of the waveguides. Each waveguide is formed to have a core surrounded by cladding material which is absent between the two waveguides at the crossover point. In one embodiment of the invention, during fabrication a core layer of material is deposited and etched to form the waveguides. It has been demonstrated that waveguides can be formed in silicon dioxide on silicon substrates. The core may be formed of a material that is primarily silicon dioxide, which includes another material such as Ge or $TiO_2$. The cladding material may be formed of a material that is primarily silicon dioxide but which includes other material such as $B_2O_3$ or $P_2O_5$. Because the core material has a refractive index that is different from the refractive index of the cladding layers, optical signals will be guided along the optical waveguide.

As contemplated, the waveguides are formed in the respective substrates and the substrates are then sandwiched together so that the waveguides extend in spaced, generally parallel planes crossing one another. At the cross point the cladding material is absent from the respective waveguides and a coupling material, such as an electro-optical or thermo-optical material, is deposited between the two cores of the waveguides. The waveguides may also be constructed on substrates of other materials such as lithium niobate or a semiconductor such as GaAs by diffusion or crystal growth. Such techniques are disclosed in U.S. Pat. No. 4,618,210.

Figure 4:
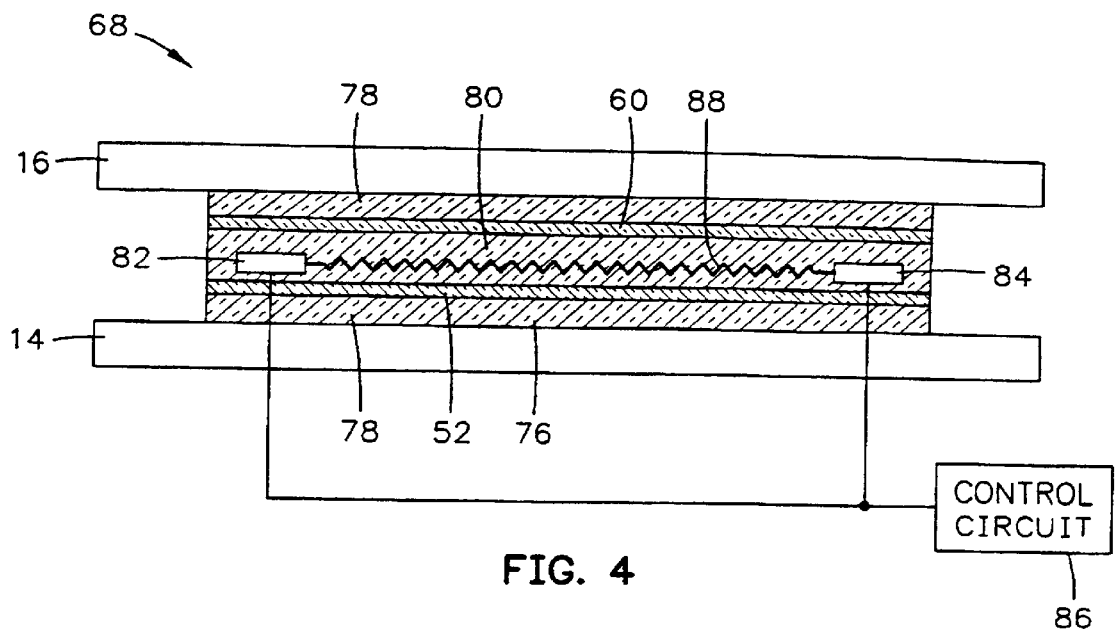
FIG. 4 is a diagrammatic sectional illustration of a cross-over point taken on line 4—4 of FIG. 1.

Referring to FIG. 4, a diagrammatic elevational sectional view of cross point 68 (FIG. 1) is illustrated. At this cross point, waveguides 52 and 60 intersect and extend parallel to each other in spaced planes. Waveguide 52 is shown formed in substrate 14 as a core with lower cladding 78. Overlying the section of waveguide 52 is waveguide 60 with cladding 78 on one side thereof. The cladding is omitted on the sides between the two waveguides. This area is filled with a coupling material 80 that is either an electro-optical or a thermo-optical material. The material responds to either an electric field or a thermal input to change the refractive index to switch the light pulses along one or the other of the waveguides over to the other waveguide. The coupling material is selected to have an index of refraction equal to that of the cladding until it is activated either by a thermal or electrical input. Electro-optical materials that may be used include lithium niobate, lithium tantalite and liquid crystals, among others. There are many different thermo-optical materials that can be used, including $S_iO_2$, or a large number of polyimides, organic polymers and inorganic glasses, to name a few.

A pair of elements 82 and 84 are coupled or connected to coupling material 80 and to control circuit 86. Assuming the coupling material is electro-optical, the control circuit applies a voltage across the material to change its refractive index to allow light pulses to cross over from one waveguide to the other. If coupling material 80 is thermo-optical, elements 82, 84 are connected to heating element 88 which changes the temperature of the coupling material and thereby changes the refractive index of the coupling material.

Where the optical switch of the invention is responsive electro-optically, heating element 86 shown in FIG. 4 does not exist and signals applied to electrodes 82, 84 from control circuit 86 provide the signals to change the index of refraction of the coupling material.

Figure 5:
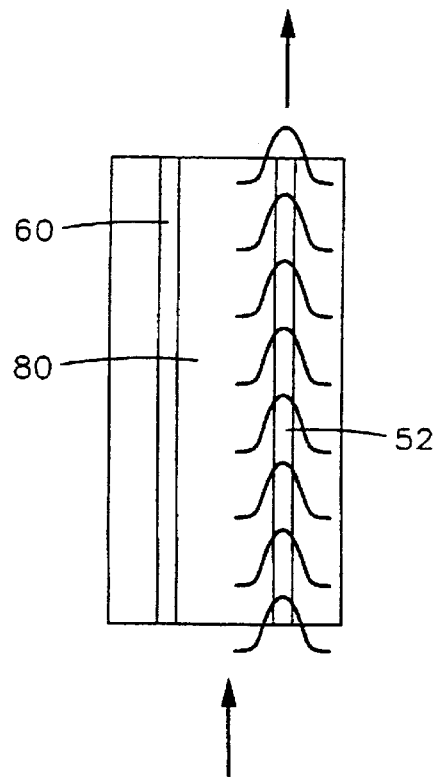
FIG. 5 is a diagrammatic illustration of the optical signal at the crossover point of FIG. 4 in a non-switching mode.
Figure 6:
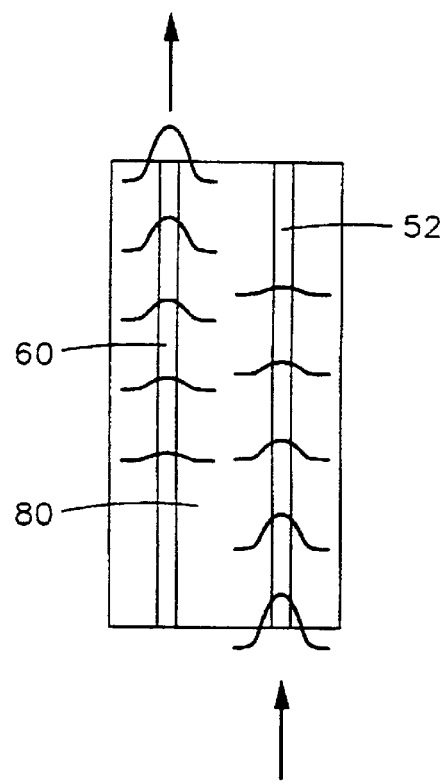
FIG. 6 is a diagrammatic illustration of the optical signal at the crossover point of FIG. 4 in a switching mode.

Referring to FIGS. 5 and 6, a representation of the operation of switching in the present invention is illustrated. As shown in FIG. 5, when input light pulses are flowing along waveguide 52 and the index of refraction of the coupling material is the same as the cladding material, the light signals pass by the crossover point and continues along the same waveguide, that is, there is no switching effect. However, as shown in FIG. 6, when a control signal is applied to coupling material 80 to change its index of refraction to a value different than that of the cladding, the light pulses migrate from waveguide 52 to waveguide 60 to provide an output signal on fiber output 42 (see FIG. 1).

The illustrated embodiment is shown to be rectangular in configuration. This places the waveguides at a generally ninety-degree angle at the crossover points, with each waveguide having a 45° jog to achieve short parallel segments. However, it will be appreciated that the switch body may have other configurations such as hexagonal, for example. This would enable the crossover of the waveguides to be at sixty degrees rather than ninety degrees as in the rectangular configuration. Such a construction could have an advantage for some applications. Other angle arrangements could be employed.

The embodiment as illustrated and described shows the waveguides all having an angled portion at the crossover points. However, it will be appreciated that only one set of the waveguides needs to have an angled portion at the crossover point to extend parallel to the other waveguide, which may remain straight. This can be more easily accomplished where the two sets of waveguides are at less than a ninety-degree angle to one another. Such a configuration could easily be embodied in a hexagonal substrate, for example. In an alternative embodiment, the upper and lower waveguides could be curved, as could the portions that are parallel and constitute the crossover portion. While the terms "orthogonal" and "parallel" are employed herein, the invention is not so limited. In general, the waveguides in spaced parallel planes are generally more orthogonal than parallel to each other, and the matching crossing segments are generally more parallel than orthogonal to each other.

It will also be appreciated that the switch assembly could have more than two levels or planes of waveguides and switch between the various levels. The terms "light" and "optical" as used herein should not be so construed as to limit the optical signals with which the switch of the invention operates to the visible spectrum.

The invention has been illustrated and described by means of specific embodiments. It is to be understood that numerous changes and modifications maybe made there in without departing from the scope of the invention as defined in the appended claims.

What is claimed is:

1. An optical switching element comprising:
    a first substrate;
    at least a first waveguide in a first plane in said first substrate;
    a second substrate;
    at least a second waveguide in a first plane in said second substrate, said first and second substrates being coupled together in such a manner that said first planes in said first and second substrates are in facing relationship, said first and second waveguides being in spaced relationship and crossing each other at an angle, at least one of said first and second waveguides being formed with an angled segment so that said segment is in spaced parallel relationship with the other waveguide at said crossing; and
    controllable coupling material disposed between said waveguides at said crossing.

2. The switching element of claim 1, wherein said first and second waveguides cross at an angle generally of about ninety degrees.

3. The switching element of claim 1, wherein said segment at said crossing of each waveguide extends at an angle of about forty-five degrees.

4. The switching element of claim 1, wherein said coupling material is responsive to an electric field to change its index of refraction.

5. The switching element of claim 1, wherein said coupling material is thermally responsive to change its index of refraction.

6. The switching element of claim 1, wherein said waveguides have a cladding except in the area of said crossing, and said coupling material has a refractive index normally about equal to that of said cladding.

7. The switching element of claim 1, wherein there are a plurality of waveguides in each of said first and second substrates.

8. The switching element of claim 7, wherein said waveguides cross at an angle of about ninety degrees, and said crossing of each waveguide extends at an angle of about forty-five degrees.

9. The switching element of claim 8, wherein said waveguides have a cladding except in the area of said crossing, and said coupling material has a refractive index normally about equal to that of said cladding.

10. The switching element of claim 7, wherein said coupling material is responsive to an electric field to change its index of refraction.

11. The switching element of claim 7, wherein said coupling material is thermally responsive to change its index of refraction.

12. The switching element of claim 1, and further comprising:
    means for selectively changing the index of refraction of said coupling material.

13. An optical switching assembly comprising:
    a substrate;
    at least a first plurality of waveguides in a first plane in said substate;
    at least a second plurality of waveguides in a second plane parallel to and spaced from said first plane in said substrate, the second waveguides crossing the first waveguides at an angle;
    said first waveguides each having a segment extending parallel to a segment of said second waveguides at said crossing; and
    controllable coupling material disposed between said segments of said waveguides at said crossing.

14. The switching element of claim 13, said waveguides have a cladding except in the area of said crossing, and said coupling material has a refractive index normally about equal to that of said cladding.

15. The switching element of claim 13, wherein said coupling material is responsive to an electric field to change its index of refraction.

16. The switching element of claim 13, wherein said coupling material is thermally responsive to change its index of refraction.

17. The switching element of claim 13, wherein:
    said waveguides in said first plane cross said waveguides in said second plane at an angle of about ninety degrees; and
    said segment at said crossing of each waveguide extends at an angle of about forty-five degrees.

18. The switching element of claim 17, wherein said waveguides have a cladding except in the area of said crossing, and said coupling material is responsive to change its index of refraction to an electric field and has a refractive index normally about equal to that of said cladding.

19. The switching element of claim 17, wherein said waveguides have a cladding except in the area of said crossing, and said coupling material is thermally responsive to change its index of refraction, said coupling material having an index of refraction normally about equal to that of said cladding.

20. The switching element of claim 13, and further comprising:
    means for selectively changing the index of refraction of said coupling material.

21. An optical system comprising:
    a first waveguide extending in a first plane, said first waveguide having a first coupling segment;
    a second waveguide extending in a second plane, said second waveguide extending generally more orthogonal to than parallel to said first waveguide, said second waveguide having a second coupling segment extended more parallel to than orthogonal to said first coupling segment;

coupling material disposed between said first coupling segment and said second coupling segment; and a controller for controlling said coupling material so as to control the coupling of light between said first waveguide and said second waveguide.

22. The optical system of claim 21, wherein said coupling material is responsive to an electric field to change its index of refraction.

23. The optical system of claim 21, wherein said coupling material is thermally responsive to change its index of refraction.

24. The optical system of claim 21, wherein said waveguides have a cladding except in the area of said crossing, and said coupling material has a refractive index normally about equal to that of said cladding.

25. The optical system of claim 21, wherein said controller selectively changes the index of refraction of said coupling material.

26. An optical system comprising:

at least a first waveguide extending in a first plane, said first waveguide having a first coupling segment;

at least a second waveguide extending in a second plane, said second waveguide having a second coupling segment, said first and second waveguides being in spaced relationship and crossing each other at an angle, said second waveguide coupling segment extended more parallel to than orthogonal to said first waveguide coupling segment; and controllable coupling material disposed between said first waveguide coupling segment and said second waveguide coupling segment.

* * * * *